UNITED STATES PATENT OFFICE.

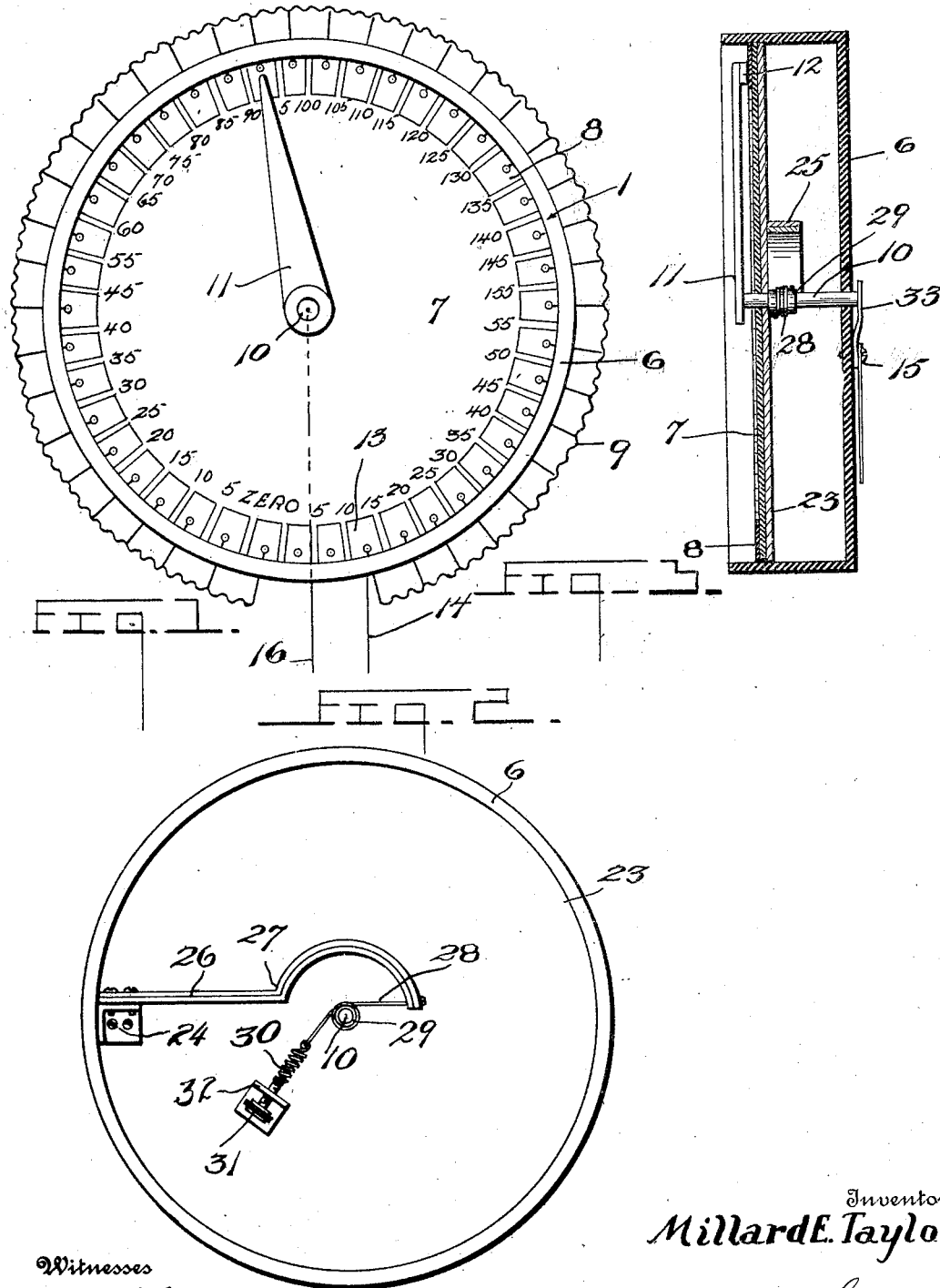

MILLARD E. TAYLOR, OF ASHTABULA, OHIO.

ELECTRICAL TEMPERATURE-RECORDER.

1,047,855.  Specification of Letters Patent.  Patented Dec. 17, 1912.

Application filed May 6, 1910. Serial No. 559,716.

*To all whom it may concern:*

Be it known that I, MILLARD E. TAYLOR, a citizen of the United States, residing at Ashtabula, in the county of Ashtabula and State of Ohio, have invented certain new and useful Improvements in Electrical Temperature-Recorders, of which the following is a specification.

This invention relates to improvements in temperature recorders, and has for one of its objects a provision of a series of thermometers disposed in series and connected to a common register or indicator.

Another object is to provide an improved construction of thermometer, and one which is very sensitive to changes in temperature.

With these and other objects in view, the invention consists in the construction, combination and arrangement of parts as will be more fully hereinafter described and pointed out in the claim, but it will be understood that changes in the specific structure may be made within the scope of the claim, without departing from the spirit of the invention.

In the drawings: Figure 1 is a diagrammatic view of the thermometer, Fig. 2 is a rear elevation of the thermometer, the casing being removed, and Fig. 3 is a vertical sectional view of the thermometer.

Referring particularly to the drawings, 1 represents a thermometer located in any suitable place or room of a building, which comprises a casing 6 in the front portion of which is secured a dial 7 on the face of which and adjacent the periphery thereof, is disposed in circular series a plurality of contact plates 8, connected by means of the resistances 9.

In the practical use of the device there is a plurality of these thermometers located at various points in a building, and all in circuit with an indicator located in the furnace room or engine room.

Mounted on the arbor 10, is an indicator hand 11, on the outer end of which and adapted to bear on the contact plates 8 is a contact finger 12. To the contact plate 13 is connected a wire 14, which leads to the engine room. A common return wire 16 is connected to the arbor 10, of the thermometer and leads to an indicator also located in the engine room, but not shown. The arbor of the thermometer is connected directly to this return wire 16 so that a current established through the thermometer will pass through the indicator and the source of electric supply, (not shown).

Referring particularly to Fig. 2 it will be seen that, secured to the partition 23, within the casing, by means of the bracket 24 is a thermostatic bar 25, said bar comprising two strips of unlike metals. These strips comprise the horizontal straight portions 26, the outer ends of which bow upwardly from the point 27. To the free end of the bowed portion of the bar 25 is attached a cord 28 which is wound a number of times around the drum 29 on the arbor of the indicator hand. The opposite end of the cord 28 is secured to one end of the spring 30 which spring has its other end attached to an adjusting screw 31, passing through an aperture in a bracket 32. By means of this adjusting screw 31 the tension of the spring 30, is varied to adjust the hand to the proper position on the dial. To take the current off the arbor of the indicator hand I have provided the spring contact finger 33 secured to the rear of the cover of the casing and contacting with the end of the arbor, said spring at its other end being secured to and insulated from the casing, as at 15 in Fig. 3.

As shown in Fig. 2 an expansion of the thermostatic bar 25 will pull the cord 28 against the tension of the spring 30, and a reduction of the temperature will tend to allow the bar to assume its normal position permitting the spring to contract and pulling on the cord 28, rotate the hand back to its original position.

By means of the present invention the temperature of any locality is accurately determined at a point of heat supply by the simple throwing of a switch arm, the thermometer accurately indicating the rise and fall of temperature.

What is claimed is:

A thermometer comprising a casing, a bracket in the casing, and which is secured to the wall of the casing, a thermostatic bar having a straight portion secured to said bracket, said straight portion extending toward the center of the casing, said thermostatic bar having its outer end upwardly bowed, an arbor within the casing and carrying an indicator hand, a contact finger engaging one end of the arbor, a cord attached at one end to the free end of the bowed portion of the thermostatic bar, and passing around the arbor, a bracket on the back of the casing, an adjusting screw threaded through said bracket and a spring secured at one end to the other end of the cord, and at its other end to the adjusting screw.

In testimony whereof I affix my signature, in the presence of two witnesses.

MILLARD E. TAYLOR.

Witnesses:
 ORETA S. TAYLOR,
 C. S. TAYLOR.